(12) United States Patent
Kokami et al.

(10) Patent No.: US 6,972,918 B2
(45) Date of Patent: Dec. 6, 2005

(54) MAGNETIC DISK MEMORY SYSTEM

(75) Inventors: Yasuhiko Kokami, Takasaki (JP);
Minoru Kurosawa, Takasaki (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 102 days.

(21) Appl. No.: 10/448,179

(22) Filed: May 30, 2003

(65) Prior Publication Data

US 2003/0227707 A1   Dec. 11, 2003

(30) Foreign Application Priority Data

Jun. 6, 2002 (JP) .............................. 2002-165589
Aug. 26, 2002 (JP) .............................. 2002-245698

(51) Int. Cl.[7] ........................................... G11B 21/02
(52) U.S. Cl. ......................................... 360/75; 360/69
(58) Field of Search .............................. 360/75, 73.03, 360/78.04; 318/254, 245, 439, 456

(56) References Cited

U.S. PATENT DOCUMENTS 6,160,368 A * 12/2000 Plutowski ................... 318/375
6,396,652 B1 * 5/2002 Kawachi et al. .............. 360/75
6,549,359 B1 * 4/2003 Bennett et al. ............... 360/69

FOREIGN PATENT DOCUMENTS

JP  7-14331  1/1995

* cited by examiner

*Primary Examiner*—David Hudspeth
*Assistant Examiner*—Jason Olson
(74) *Attorney, Agent, or Firm*—Miles & Stockbridge P.C

(57) ABSTRACT

In a magnetic disk memory device, the shifting speed of the magnetic head in time of power supply interruption is detected, and a voice coil motor is controlled in accordance with the detected shifting speed to enable the head to be shunted safely and promptly. In a magnetic disk memory device having a spindle motor for revolving a magnetic disk, a magnetic head for reading information from the magnetic disk, a voice coil motor for shifting this magnetic head, and a voice coil motor drive circuit for controlling the drive current of the voice coil motor, the shifting speed of the head in time of power supply interruption is detected on the basis of the back electromotive force generating on the coil of the voice coil motor in time of power supply interruption, there are further provided a retract control circuit for generating a current command value for the voice coil motor drive circuit on the basis of the result of detection and a booster circuit for boosting a voltage resulting from the rectification of the back electromotive force generating in the coil of the spindle motor, wherein the voice coil motor drive circuit and the retract control circuit are operated with the voltage boosted by the booster circuit in time of power supply interruption to control the current to be made to flow to the coil of the voice coil motor and thereby to shunt the magnetic head.

20 Claims, 9 Drawing Sheets

MAGNETIC DISK MEMORY SYSTEM

BACKGROUND OF THE INVENTION

The present invention relates to a control technique for magnetic disk memory devices and a technique that can be effectively applied to motor control for use when power supply has been interrupted, such as in a power failure, and more particularly to a technique that can be effectively applied to controlling the shunting of a head by a voice coil motor for shifting magnetic heads for reading/writing information from or onto a memory track on a magnetic disk in a hard disk device for instance.

A magnetic disk memory device is provided with, in addition to a spindle motor for driving the revolution of a magnetic disk, a voice coil motor for shifting magnetic heads for reading/writing information from or onto a memory track on a magnetic disk along the surface of the disk in the radial direction (shifting the heads for a seek). A hard disk device is so configured that a magnetic head be glided over the disk surface by a wind pressure arising with the revolution of the disk, and there is a fear that, when the disk stops revolving, the magnetic head may come into contact with and damage the disk surface. Furthermore, if the density of magnetic recording increases so much that the disk surface becomes a mirror surface, the head at halt may be sucked by the disk surface to obstruct the revolution of the disk.

Because of this fear, when the disk is at halt, an operation (to be referred to as unloading in this specification) to shunt the magnetic head to a supporting base known as a ramp in a standby position outside the disk. On the other hand, when the head starts a seek, the magnetic head should be shifted (loaded) onto the disk from the ramp position. If, in this process, the magnetic head is shifted too fast by the voice coil motor, the magnetic head may come into contact with and damage the disk surface. The usual practice for avoiding this trouble is to monitor the back electromotive force of the voice coil motor and control the shifting speed of the magnetic head on that basis.

SUMMARY OF THE INVENTION

In a hard disk device, the magnetic head should of course be shunted in time of a power failure for the same reason as the need to shunt the magnetic head to the ramp outside the disk when the disk revolution is at halt as stated above. In this specification, this shunting of the head to the ramp in time of power supply interruption will be referred to as "retracting". However, as power supply to the control circuit for the voice coil motor is also interrupted in time of a power failure, the voice coil motor can be neither driven nor controlled. Therefore, there is proposed an invention according to which a shunting driver (hereinafter referred to as the retract driver) is provided separately for the driver for the voice coil motor for use in a head seek (hereinafter referred to as the VCM driver), and the retract driver is actuated in time of a power failure by utilizing the back electromotive force of the spindle motor (the Japanese Patent Application Laid-open No. Hei 7(1995)-14331).

However, since a power failure occurs unexpectedly, it may arise when the magnetic head is being shifted towards the center of the disk or towards its circumference. If a power failure occurs when the head is being shifted in the reverse direction to shunting, i.e. towards the center of the disk, a large enough drive force should be given to the voice coil motor to slow down the speed of the magnetic head and further reverse its shifting direction. On the other hand, if a power failure occurs when the magnetic head is being shifted towards the circumference of the disk, the motor cannot be braked and the head may hit against the ramp unless the back electromotive force arising in the voice coil motor is restrained.

However, as the retract driver according to the above-cited prior invention, consisting of a transistor which performs current sourcing, can supply but not lead in a current, there is a problem that the back electromotive force of the voice coil motor cannot be suppressed for braking. Also, when the retract driver is to be operated with a voltage resulting from the rectification of the back electromotive force of the voice coil motor in time of a power failure, a voltage obtained by simply rectifying the back electromotive force of the voice coil motor with a diode bridge would invite a crop in the voltage in the forward direction of the diode. For this reason, a problem was revealed that the retract driver cannot be adequately operated for a small motor whose back electromotive force of the voice coil motor is small or where the revolution of the spindle motor is slow.

An object of the present invention is to provide a control technique for voice coil motors permitting fail-free shunting of a magnetic head in a magnetic disk memory device when power supply is interrupted.

Another object of the invention is to provide a control technique for voice coil motors permitting, in time of interruption in power supply to a magnetic disk memory device when its magnetic head has shifted towards the ramp outside the disk, prevention of the collision of the magnetic head against the ramp and the resultant deterioration of the reliability of the head by braking the back electromotive force generating in its voice coil motor.

Still another object of the invention is to provide a control technique for voice coil motors enabling, in time of interruption in power supply to a magnetic disk memory device whose spindle motor is a small one with only a weak back electromotive force or when the revolution of its spindle motor is slow, its magnetic head to be shunted by driving its voice coil motor with a voltage resulting from the rectification of the back electromotive force of the voice coil motor.

Yet another object of the invention is to provide a control technique for voice coil motors enabling, in a magnetic disk memory device, the shifting speed of its magnetic head at time of power supply instruction to be detected and to shunt the head safely and promptly by controlling its voice coil motor according to the shifting speed.

The above-stated and other objects and features of the invention will become more apparent from the following description in this specification when taken in conjunction with the accompanying drawings.

Typical aspects of the invention disclosed in this application will be briefly described below.

Thus, in a magnetic disk memory system provided with a spindle motor for revolving a magnetic disk; a magnetic head for reading information out of a memory track on the magnetic disk revolved by the spindle motor; a voice coil motor for shifting the magnetic head over the disk; a voice coil motor drive circuit, including an MOS transistor, for shifting the magnetic head by controlling a current to be made to flow to the coil of the voice coil motor; and a booster circuit capable of boosting a source voltage or a voltage resulting from the rectification of a back electromotive force generating in the coil of the spindle motor, wherein a control circuit (retract control circuit) is provided which, in time of power supply interruption, detects the shifting speed of the head on the basis of the back electromotive force generating in the coil of the voice coil motor, and can generate a current command value for the voice coil motor drive circuit according to the result of detection; and in time of power supply interruption the voice coil motor drive circuit and the control circuit are operated with a voltage boosted by the booster circuit, and the magnetic head is shifted to a prescribed standby position by controlling the current flowing to the coil of the voice coil motor.

Since the above-described means is so configured that, in time of power supply interruption, the drive current for the voice coil motor is derived from the back electromotive force of the voice coil motor, the magnetic head can be safely shunted in time of power supply interruption without providing power supply backup means. Furthermore, as the booster circuit is operated in time of power supply interruption and the voice coil motor drive circuit and the control circuit are operated with a voltage boosted by the booster circuit, a current can flow to the coil of the voice coil motor even in time of power supply interruption, the magnetic head can be thereby shunted to a prescribed standby position. Moreover, even if the spindle motor is a small one with a weak back electromotive force, as the voice coil motor drive circuit is operated with the boosted voltage, the magnetic head can be reliably shunted.

Also, as the above-described means so operates the voice coil motor drive circuit in time of power supply interruption as to make a drive current for shunting the magnetic head flow to the coil of the voice coil motor by using a MOS transistor intended for making a current flow to the coil of the voice coil motor during normal operation, even if power supply is interrupted when the head is shifting toward its standby position, the MOS transistor for driving use can absorb the current deriving from the back electromotive force generating in the coil of the voice coil motor, and the coil motor can be thereby braked to prevent reliability from being deteriorated by the collision of the magnetic head against the ramp, which is its standby position. Furthermore, as it is provided with a control circuit for detecting the shifting speed of the head in time of power supply interruption and generating a current command value for the voice coil motor drive circuit according to the result of detection, the magnetic head can be shunted to the ramp more safely and promptly.

DETAILED DESCRIPTION OF THE PREFERRED EMBODIMENT

Preferred embodiments of the present invention will be described in detail below with reference to accompanying drawings.

Figure 1:
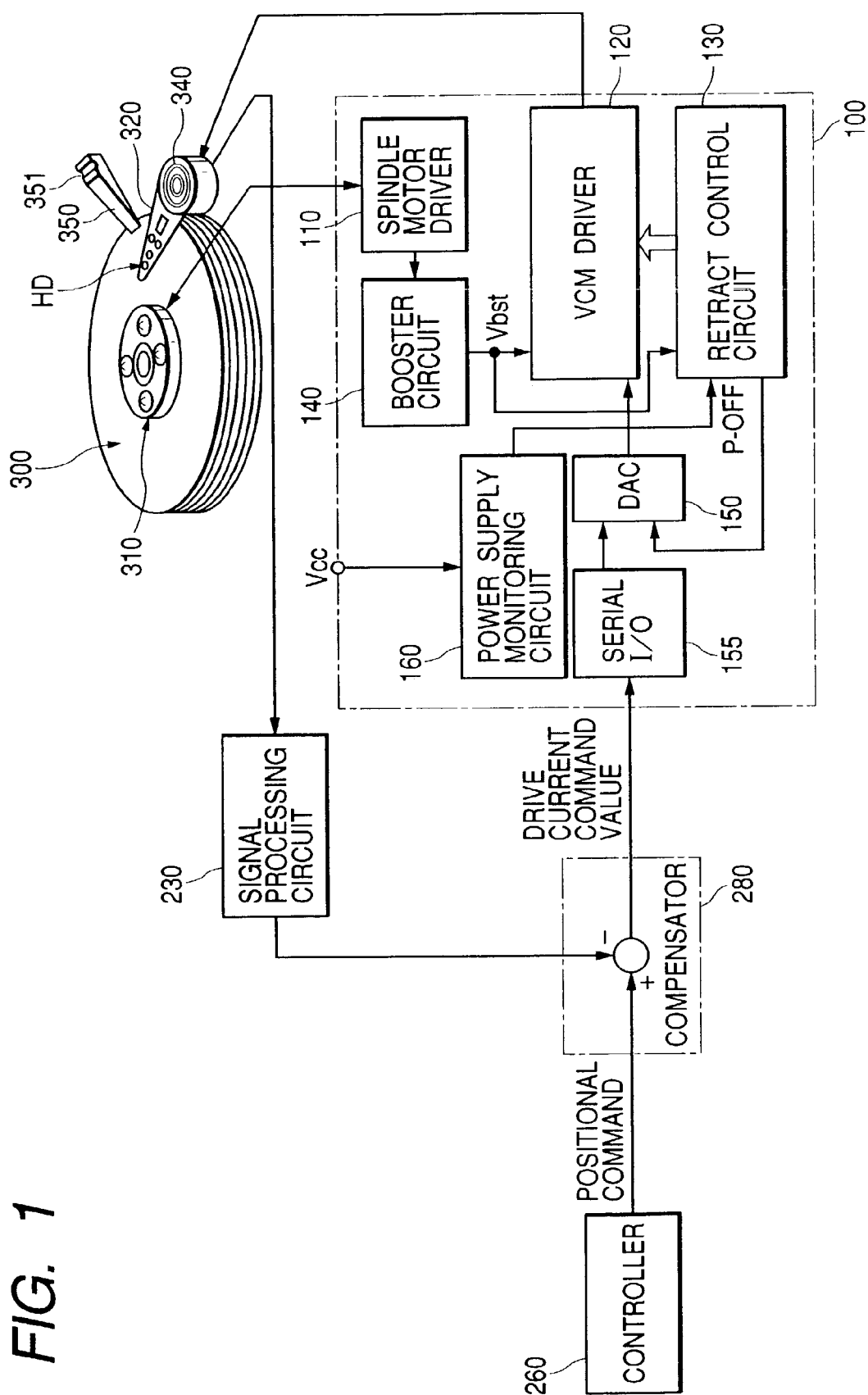
FIG. 1 schematically shows the configuration of a voice coil motor and spindle motor control system in a magnetic disk memory device pertaining to the present invention.

FIG. 1 schematically shows the configuration of a motor control system in a magnetic disk memory device pertaining to the present invention.

As shown in FIG. 1, the magnetic disk memory device embodying the invention in this mode has a magnetic disk 300, a spindle motor 310 for driving the revolution of the magnetic disk 300 at high speed, an arm 320 having at its tip a magnetic head HD for reading/writing information from or onto a memory track of the magnetic disk 300, a voice coil motor 340 for shifting the magnetic head HD over the magnetic disk 300 by way of the arm, a motor drive circuit 100 in a semiconductor integrated circuit configuration for driving this voice coil motor 340, a signal processing circuit 230 for writing onto the magnetic disk 300 or detecting positional information on the basis of a read signal by driving the magnetic head HD, a controller 260 for controlling the operation of the whole magnetic disk memory device and supplying head position command information (track position), and a compensator 280 for delivering to the motor drive circuit 100, on the basis of the position command information from the controller 260 and the positional information (servo signal) detected by the signal processing circuit 23, a value matching the difference between them as a drive current command value. Reference numeral 350 denotes a ramp, arranged outside the magnetic disk 300, for supporting the arm 320 when the revolution of the disk is stopped. This ramp 350 has a latch portion 351 for engaging the arm 320.

The controller 260 is configured of a microcomputer (CPU) or the like. In this configuration, the functions of the compensator 280 can also be incorporated into the CPU. The drive current command value supplied from the compensator 280 is delivered to the motor drive circuit 100 to control the driving of the voice coil motor 340. In this motor drive circuit 100 are provided a spindle motor driver 110, a VCM driver 120, a retract control circuit 130, and a booster circuit 140 for boosting the source voltage. This motor drive circuit 100 is further provided with a D/A converter 150 for converting the drive current command value in the digital data form supplied from the compensator 280 into a drive current command value in an analog form, a serial I/O (input/output port) 155 for converting the drive current command value supplied serially from the compensator 280 into parallel data and entering the converted data into the D/A converter 150, and a power supply monitoring circuit 160 for detecting the occurrence of any power failure.

Figure 2:
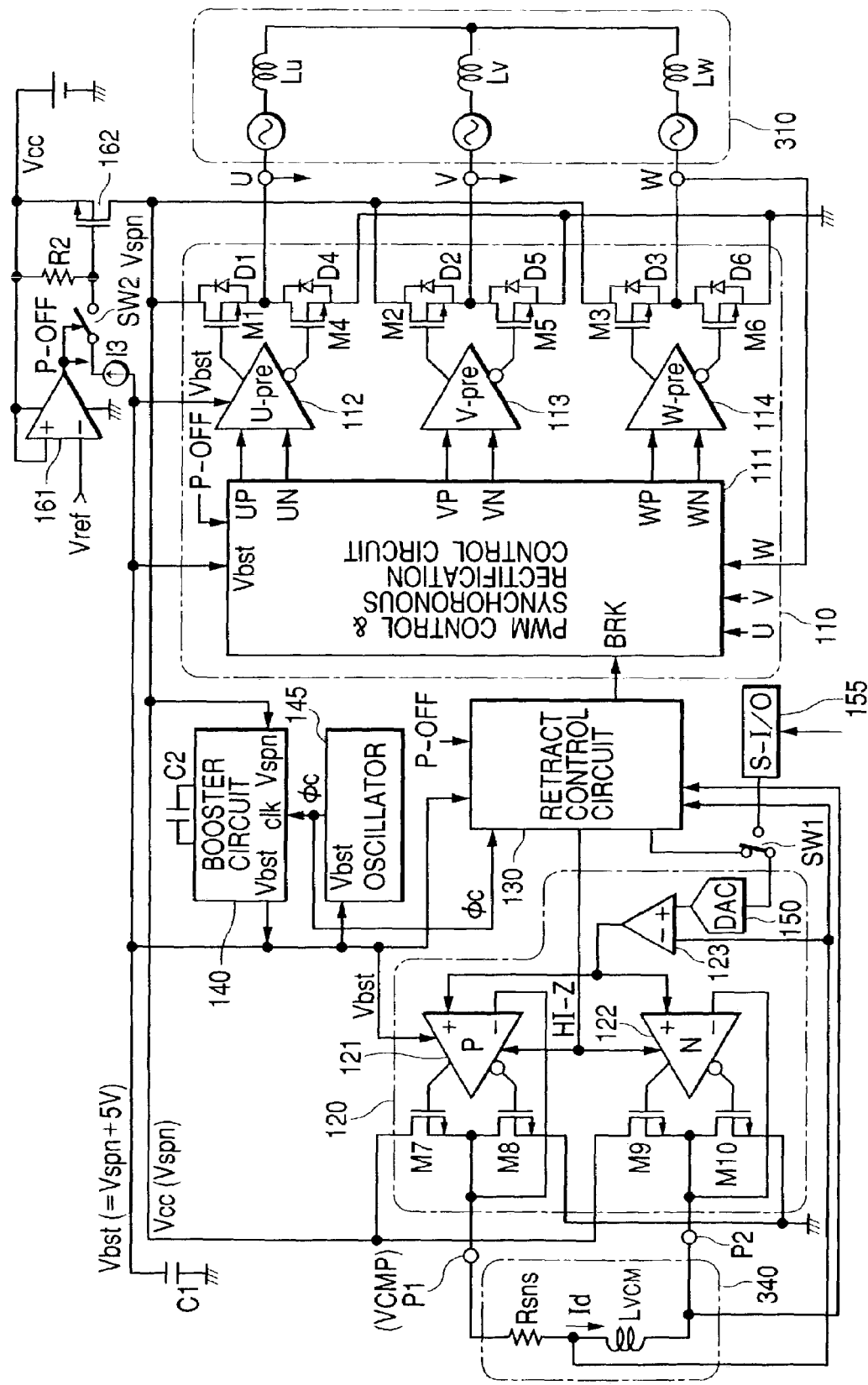
FIG. 2 is a block diagram showing a drive control circuit for the voice coil motor and the spindle motor in the magnetic disk memory device, which is a preferred embodiment of the invention.

FIG. 2 shows an example of motor drive control circuit in the magnetic disk memory device of FIG. 1.

In FIG. 2, reference sign LVCM denotes a drive coil of the voice coil motor 340 for shifting the magnetic head over the magnetic disk; Rsns, a sense resistor for current detection, connected in series to this coil LVCM; and 120, a VCM driver. With this VCM driver 120, a current matching the output of the D/A converter 150 is let flow to the coil LVCM to drive the voice coil motor. The VCM driver 120 is configured of N-channel type power MOSFETs M7, M8, M9 and M10, coupled to connection terminals P1 and P2 of the coil LVCM, for making current flow to the coil; a pair of coil drive amplifiers 121 and 122 for controlling the gate voltages of these power MOSFETs M7, M8, M9 and M10; and a control amplifier 123 for comparing the detection value of the sense resistor Rsns and the output value of the D/A converter 150 and generating input signals to the coils 121 and 122. This configuration enables a current coinciding with the drive current command value entered into the D/A converter 150 to flow to the coil LVCM.

This embodiment of the invention is so configured that the voltage at the both ends of the drive coil LVCM of the voice coil motor 340 be entered into the retract control circuit 130, and perform retract control by to brake the voice coil motor or to shunt the magnetic head 340 by controlling the VCM driver 120 in time of a power failure.

Reference numeral 140 denotes a booster circuit consisting of a charge pump for boosting the source voltage Vcc; and 145, an oscillator for generating an operation clock φc for this booster circuit 140. The booster circuit 140, configured of a booster circuit which may be a charge pump for instance, in time of a power failure operates on a voltage Vspn resulting from the rectification of the back electromotive force of the spindle motor 310 and boosts it to about twice of three times Vspn.

A boosted voltage Vbst provided by the booster circuit 140 is accumulated in a smoothing capacitor C1. The accumulated boosted voltage Vbst, as it is supplied in time of a power failure as the source voltage to the coil drive amplifiers 121 and 122 which control the gate voltages of the power MOSFETs M7, M8, M9 and M10 which makes currents flow to the coil of the voice coil motor 340, can sufficiently actuate the power MOSFETs M7, M8, M9 and M10 even if they consist of N-channel type MOSFETs to shunt the magnetic head. The purpose of the use of N-channel type MOSFETs as the power MOSFETs M7, M8, M9 and M10 would be to reduce the chip size, compared with the use of P-channel type MOSFETs.

Further, this embodiment is so configured that the oscillator 145 is also operated by the boosted voltage Vbst supplied by the booster circuit 140. Although the oscillator 145 can as well be disposed to operate on the back electromotive force of the voice coil motor in time of a power failure as does the booster circuit 140, the use of the boosted voltage Vbst makes it possible to avoid temporary absence of a voltage supply and the resultant stop of oscillation when the supply is switched over from the source voltage Vcc to the back electromotive force Vspn in time of a power failure. Since the oscillator 145 can be configured of a known circuit, such as a ring oscillator, reference to or description of any specific circuit by way of an example is dispensed with here.

Further in FIG. 2, reference numeral 161 denotes a comparator constituting the power supply monitoring circuit 160, and 162, a power switch for turning on and off power supply, under on/off control by SW2 responding to the output of the comparator 161. The comparator 161 operates on the source voltage Vcc and is supplied with the source voltage Vcc at its uninverted input terminal and with a reference voltage Vref at its inverted input terminal. As long as the source voltage Vcc is supplied, the output P-OFF of the comparator 161 is caused to take on a high level, turns on the power switch 162 with a voltage equivalent to the multiplication of R2 by I3 and, when the supply of the source voltage Vcc is interrupted, the output P-OFF of the comparator 161 is varied to a low level to turn off SW2 and to place the power switch 162 in an off state. The power switch 162 is turned off to prevent the back electromotive force of the spindle motor 310 from flowing back to the power source side. The power supplied to the comparator 161 may as well be the boosted voltage Vbst available from the booster circuit 140.

Reference signs Lu, Lv and Lw denote coils of the spindle motor for driving the revolution of the magnetic disk. In this embodiment, the spindle motor is a three-phase brushless motor, though not limited to it. Reference numeral 110 denotes a spindle driver circuit which consists of output transistors M1, M2, M3, M4, M5 and M6 connected between the coupling terminals, source voltage terminals and grounding terminals of the coils Lu, Lv and Lw and drives the revolution of the motor by making currents flow to the coils of the spindle motor; 111, a control circuit for determining the phase coil to which the current is made to flow on the basis of the back electromotive force of the coil; and 112, 113 and 114, preamplifiers which, receiving control signals from the control circuit 111, sequentially make currents flow to the coils Lu, Lv and Lw by subjecting the output transistors M1 through M6 to on/off control. The control circuit 111, while controlling the currents to be made to flow to the coils by the pulse width modulation (PWM) in normal operation, in time of a power failure performs synchronous rectification control to subject the transistors carrying out rectification on the basis of the back electromotive forces of the coils to on/off control.

In this embodiment, even if the synchronous rectification control is not performed, the output transistors M1 through M6, each consisting of an N-channel type MOSFET, can operate as rectifier circuits, as body diodes D1 through D6 parasitic between their sources and drains rectify the back electromotive forces generating in the coils Lu, Lv and Lw of the spindle motor, can supply power to the spindle motor driver 110 and the booster circuit 140. In this embodiment, voltages boosted by the booster circuit 140 are supplied to the VCM driver circuit 120 driving the voice coil motor 340, the retract control circuit 130, the spindle motor driver 110 and so forth.

The configuration in which, in time of a power failure, the spindle motor driver 110 operates on a voltage boosted by the booster circuit 140 makes it possible to reduce the voltage drop by performing synchronous rectification control by which, when the back electromotive force is the highest among the three phases, the power source Vcc side transistor of that phase or, when the back electromotive force is the lowest, the ground side transistor is turned on. This enables shunting to be accomplished without fail by driving the voice coil motor even when the back electromotive force of the voice coil motor is weak, i.e. when the speed of revolution is slow.

Figure 3:
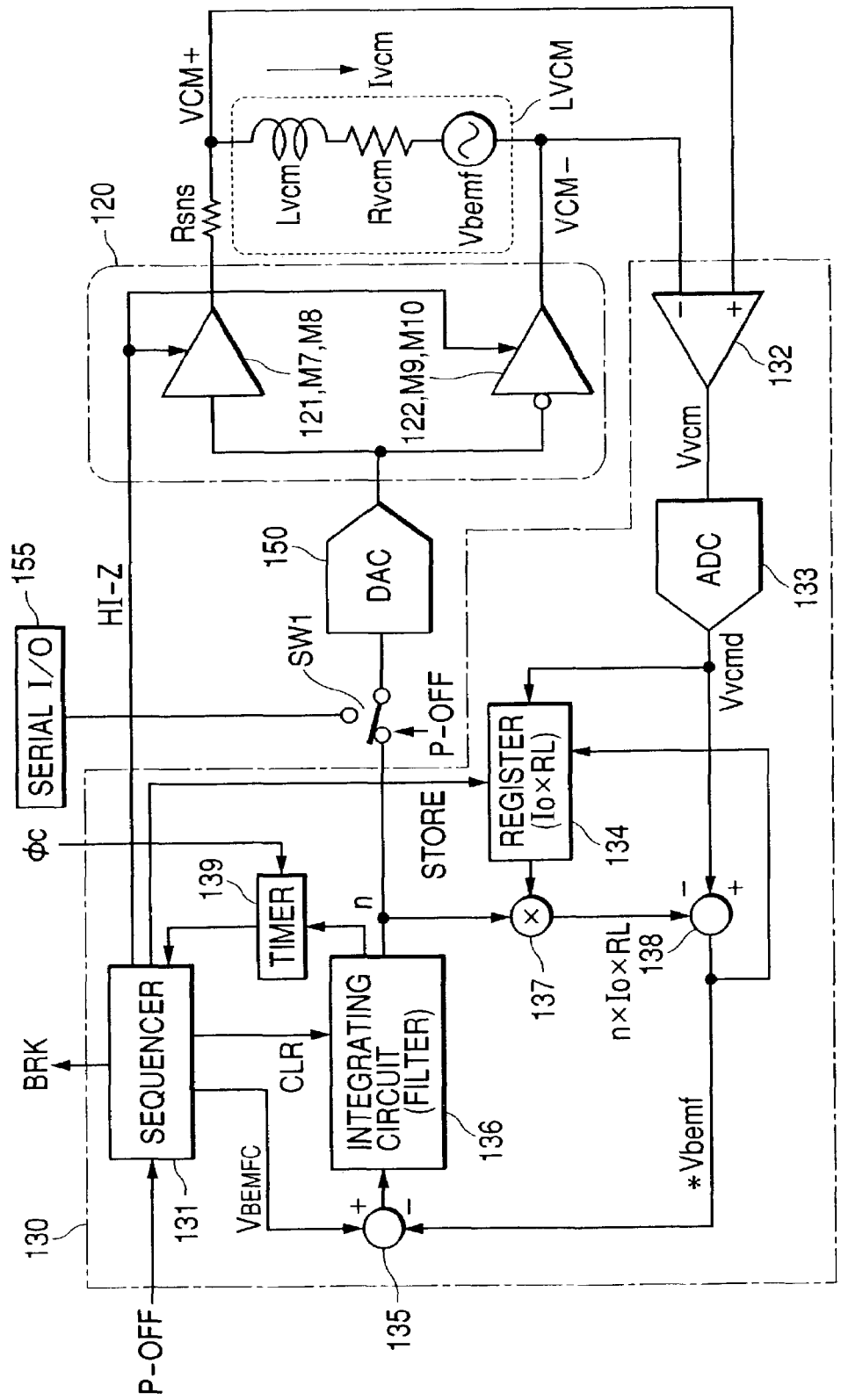
FIG. 3 is a block diagram showing an example of more detailed configuration of a retract control circuit for controlling the shunting of the voice coil motor in time of a power failure.

FIG. 3 shows a typical configuration of the retract control circuit 130. In FIG. 3, the drive coil LVCM of the voice coil motor 340 is represented by an equivalent circuit consisting of an intrinsic inductance Lvcm, an interval resistor Rvcm and a voltage source Vbemf generating a back electromotive force.

The retract control circuit 130 is configured of a sequencer 131 for generating control signals to cause circuits within the control circuit to operate in a prescribed sequence, a voltage sense amplifier 132 for detecting the inter-terminal voltage VVCM of the drive coil LVCM, an A/D converter circuit 133 for converting the detected voltage VVCM into a digital value, a register 134 for holding the A/D-converted value, a first subtractor 135 for computing the difference between a voltage command value VBEMFC supplied from the sequencer 131 and a feedback voltage *VBEMF from the coil, an integrating circuit (digital filter) 136 for integrating the output of the subtractor 135, a multiplying circuit 137 for computing the product of the integrating circuit 136 and the value held by the register 134, a second subtractor 138 for computing the difference between the output of the multiplying circuit 137 and the output of the A/D converter circuit 133, and a timer 139.

By providing the integrating circuit 136, it is made possible to prevent a speed control loop consisting of the subtractor 135—the integrating circuit 136—the D/A converter 150—the VCM driver 120—back voltage Vbemf—the voltage sense amplifier 132—the A/D converter circuit 133—the subtractor 138—the subtractor 138 from falling into an oscillation state.

Between the integrating circuit 136 and the D/A converter 150, there is provided a change-over switch SW1 for selectively entering into the D/A converter 150 the drive current command value supplied from the compensator 280 via the serial I/O 155 of the output of the integrating circuit 136. This change-over switch SW1 is caused by the output of (power-off detection signal) of the power supply monitoring circuit 160 to enter into the D/A converter 150 the drive current command value supplied from the compensator 280 when in normal operation and, in time of a power failure, the output of the integrating circuit 136.

In this embodiment the timer 139, monitoring the output of the integrating circuit 136, starts counting time when the arrival of the magnetic head in the latch position of the ramp 350 is detected and delivers a time-up signal to the sequencer 131 after counting time for a prescribed duration, and then the sequencer 131 stops the revolution of the spindle motor 310 by delivering a brake signal BRK to the spindle motor control circuit 110.

The configuration may as well be such that this timer 139 deliver the time-up signal to the sequencer 131 when a prescribed length of time has passed since the start of power failure. In this case, it is preferable, in determining the length of time to be counted by the timer 139, to take into account the longest length of time likely to be taken by the magnetic head to shift from any given position on the magnetic disk to the ramp position outside. The timer 139 can as well be so disposed as to be operated with a clock signal $\phi c$ supplied from the oscillator 145 to the booster circuit 140.

The sequencer 131 may be configured of a circuit or a random logic having a configuration similar to that of a control circuit of a known microprogram system comprising a read only memory (ROM) in which a microprogram consisting of a plurality of command codes, a counter for sequentially reading commands from the ROM, and a decoder for decoding the read commands and generating control signals.

Since the voltage command value VBEMFC supplied to the subtractor 135 can be a fixed value, if the sequencer 131 has a ROM for storing command codes, the configuration may as well be such that this value be stored in the ROM as part of the command codes or separately from the command codes and supplied at a prescribed timing. Another conceivable configuration is such that a register be provided in place of the ROM and the voltage command value VBEMFC be set in the register from the controller 260 via the serial I/O 155 by initialization or otherwise at the time of actuating the system. Alternatively, by using the source voltage Vcc or a wiring logic for generating a prescribed code with wiring connected to the grounding point, the voltage command value VBEMFC may be provided. Where a register is used, it is possible to set for each system a voltage command value VBEMFC corrected according to its performance fluctuations.

Figure 4:
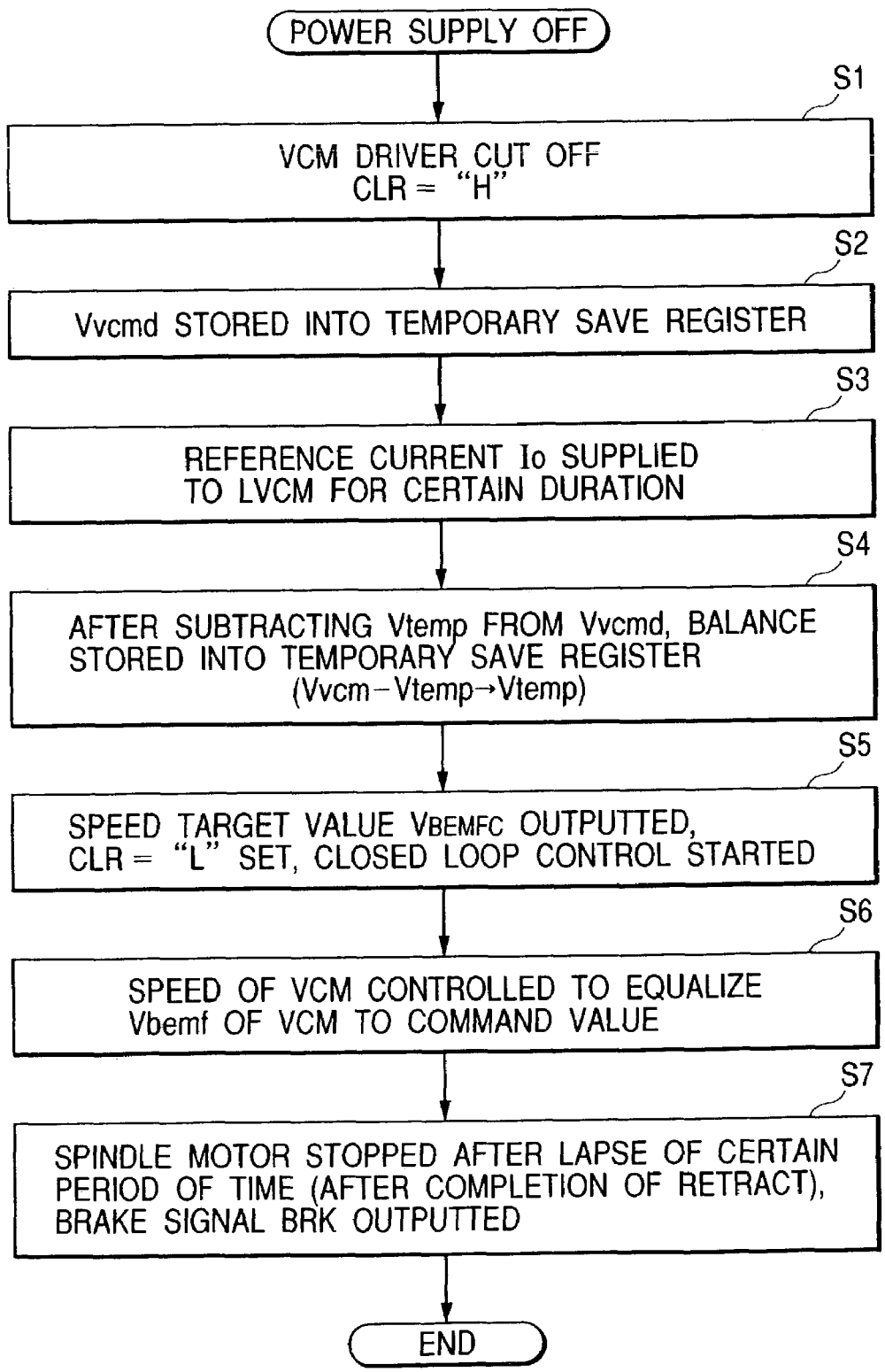
FIG. 4 is a flow chart showing an example of shunting control procedure for the voice coil motor of the retract control circuit in the embodiment of the invention in time of a power failure.
Figure 5:
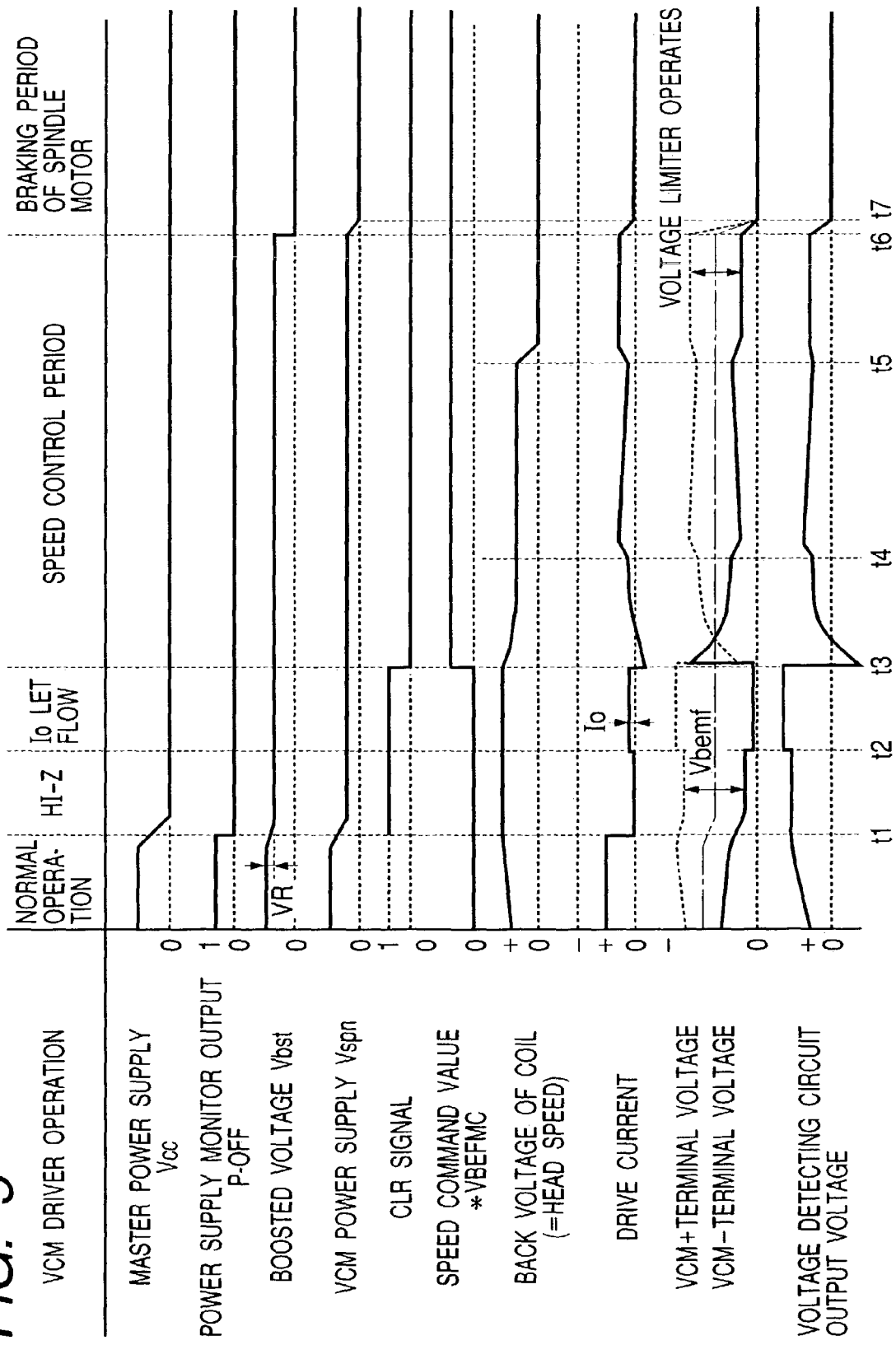
FIG. 5 is a timing chart showing the timings of signals in various parts in the shunting control of the voice coil motor by a motor drive control circuit in the embodiment of the invention in time of a power failure.

Next will be described specific actions of the retract control circuit 130 shown in FIG. 3 with reference to the flow chart of FIG. 4 and the timing chart of FIG. 5. FIG. 5 illustrates the situation that comes about when a power failure occurs when the magnetic head is being shifted from the inner portion towards the outer portion of the disk. When the magnetic head is being shifted from the inner portion towards the outer portion, the power MOSFETs M7 and M10 are turned on and the power MOSFETs M8 and M9 are turned off and a current Id directed from a terminal P1 (VCMP terminal) to a terminal P2 (VCMN terminal) is made to flow to the coil LVCM of the voice coil motor in the VCM driver circuit 120.

When the master power supply (Vcc) is interrupted by a power failure or otherwise, the output P-OFF the power supply monitoring circuit 160 varies to a low level and the power switch 162 is turned off (timing t1 in FIG. 5). Then, a voltage Vspn resulting from the rectification of the back electromotive force generating in the coils Lu, Lv and Lw of the spindle motor begins to be supplied to the VCM driver circuit 120 and the booster circuit 140. As the boosted voltage Vbst resulting from the boosting of the source voltage Vcc before the power supply interruption is held by the smoothing capacitor C1 in the booster circuit 140, the booster circuit 140 and the oscillator 145 continue to operate after the power supply interruption and the boosted voltage Vbst is generated.

Here, as the spindle motor control circuit 110 operates on the boosted voltage Vbst generated by the booster circuit 140 to perform synchronous rectification control, Vspn becomes a voltage lower than the source voltage Vcc by the voltage drop VR due to the on-resistances of the output transistors M1 through M6. It has to be noted that this voltage drop VR is less than the voltage drop due to the body diodes of the output transistors M1 through M6 (forward voltages of the diodes when no synchronous rectification control is being performed.

When the master power supply (Vcc) is interrupted, the output P-OFF from the power supply monitoring circuit 160 changes over the switch SW1 in the VCM driver circuit 120, and a value from the retract control circuit 130, instead of the current command value from the compensator 280, is supplied to the D/A converter (DAC) 150.

In the retract control circuit 130, when a power-off detection signal P-OFF is entered into the sequencer 131, a clear signal CLR of a high level is supplied from the sequencer 131 to the integrating circuit 136, and a control signal HI-Z to give a high impedance to the driver output is supplied to the VCM driver circuit 120. This serves to clear the integrating circuit 136 to vary the output n to a reference value of "1" for instance, and in the voice coil motor 340 the drive current for the coil LVCM is cut off (step S1 in FIG. 4).

Then, the magnetic head continues to shift by inertia, and a back electromotive force BEMF (a positive back electromotive force when shifting outwards or a negative back electromotive force when shifting inwards) proportional to the shifting direction and speed of the head is generated between the two terminals of the coil LVCM. In this state, the sequencer 131 gives a store signal STORE to the register 134 to have a voltage Vvcmd, resulting from the A/D conversion by the A/D converter circuit 133 of the voltage Vvcm detected by the voltage sense amplifier 132, stored into the register 134 as the initial voltage Vtemp (step S2). This causes the head shifting speed at the time of power supply failure occurrence to be held by the register 134.

Next, in order to detect the voltage drop due to the parasitic resistance Rvcm of the coil LVCM, the sequencer 131 relieves the VCM driver circuit 120 from the output high impedance command so as to make flow a prescribed reference current Io to the coil LVCM. This causes the VCM driver circuit 120 to be driven (step S3 in FIG. 4; timing t2 in FIG. 5). To add, the reference current Io then made to flow to the coil is only about a several mA according to the time constant of the coil, and its duration only a several hundred $\mu$sec in order not to let the shifting speed of the head vary. More specifically, the configuration is such that a small enough reference current Io not to let the head speed vary be made to flow to the coil when the output n of the integrating circuit 136 is "1".

Then, the inter-terminal voltage of the coil while this reference current Io is flowing is detected by the voltage sense amplifier 132, a voltage Vtemp matching the voltage Vvcmd resulting from the A/D conversion of the inter-terminal voltage by the A/D converter circuit 133 and the head shifting speed held by the register 134 is supplied to the subtractor 138, and a voltage representing the difference between them is again stored into the register 134 (step S4). Then, as the output n of the integrating circuit 136 is made n="1" by the clear signal, the voltage to be held by the register is Vvcmd−Vtemp. This causes the voltage drop (Io×RL) due to the parasitic resistance Rvcm of the coil LVCM to be held by the register 134. To add, where the voltage drop is represented by (Io×RL) when n="1", the drive current flowing to the coil LVCM makes the voltage drop due to the parasitic resistance Rvcm n×(Io×RL) when n has varied.

Following that, the sequencer 131 supplies the speed target command value VBEMFC for the magnetic head, and sets the clear signal CLR for the integrating circuit 136 to a low level to start closed loop control (step S5). Then, the balance of the subtraction by the first subtractor 135 the output of the second subtractor 138 from the speed target command value VBEMFC, i.e. the control error is entered into the integrating circuit 136.

Here, the output of the second subtractor 138 is the balance of the subtraction of the product of multiplication (n·Io·RL) of the output n of the integrating circuit 136 by the value held by the register 134 (Io·RL) by the multiplier 137 from Vvcmd (=*Vbemf+n·Io·RL) resulting from the A/D conversion of the inter-terminal voltage Vvcm (=Vbemf+n·Io·RL) of the coil, i.e. an estimated back electromotive force value *Vbemf. Therefore, the value entered from the first subtractor 135 into the integrating circuit 136 is VBEMFC−*Vbemf (=speed target command value−back electromotive force of coil).

As a result of this, the coil of the voice coil motor 340 is so driven by the VCM driver circuit 120 that the speed target be the shifting speed of the magnetic head, and accurate speed control is accomplished by the control loop of the control circuit 130 (step S6). If, for instance, the shifting speed of the magnetic head is less than the speed target or the head is shifting inwards, the output *Vbemf of the second subtractor 138 will become smaller than the speed target command value VBEMFC, and accordingly the output of the integrating circuit 136 will become greater to let a forward current (current in the direction of shifting the head outwards) flow to the coil and thereby to accelerate the shifting of the head.

On the other hand, if the shifting speed of the magnetic head is greater than the speed target as shown in the timing chart of FIG. 5, the output *Vbemf of the second subtractor 138 will become greater than the speed target command value VBEMFC, and accordingly the output of the integrating circuit 136 will become smaller to let a backward current (a current to shift the head inwards) flow to the coil and thereby to decelerate the shifting of the head (timing t3 to timing t4). When the head arrives at the ramp and slows down in speed, the back electromotive force of the coil tends to become smaller, but control is performed in the direction of increasing the output of the integrating circuit 136 so as to bring the head speed closer to the target, with the result that the drive force for the coil is increased to enable the head to go up the ramp (timing t4 to timing t5).

This embodiment is further provided with a limiter to limit the maximum level of the output of the integrating circuit 136. For this reason, when the head reaches the stop position (latch) of the ramp and slows down in speed, the output of the integrating circuit 136 increases to keep the head speed at the target level, but then the limiter is actuated to limit the output level with the result that the drive force for the coil can avoid a dramatic increase, thereby enabling the head to run off the ramp (timing t5 to timing t6).

Further, this embodiment is so disposed that, when the limiter of the integrating circuit 136 is actuated, the timer 139 be started, and the sequencer 131, when a prescribed length of time has passed after this start of the timer 139, supplies a brake start signal BRK to the spindle motor control circuit 110 (timing t6). Then, the transistors M2, M4 and M6 on the ground side, for instance, out of the drive transistors M1 through M6 of the spindle motor, are all turned on by the spindle motor control circuit 110 to apply a brake on the spindle motor.

As a result, the voltage Vspn resulting from the rectification of the back electromotive force generating in the coils Lu, Lv and Lw of the spindle motor and the boosted voltage Vbst resulting from its boosting by the booster circuit 140 drop, and the driving of the voice coil motor 340 is also stopped (timing t7).

As the conventional head shunting system using a retract driver configured of source follower type MOSFETs cannot lead in the current of the coil, if a power failure occurs on the way of a shift of the magnetic head from the inside towards the outside of the disk, the magnetic head may hit against the ramp because no brake is applied on the voice coil motor. Unlike that, this embodiment of the invention carries out shunting by using the VCM driver circuit 120 which, as described above, can lead in a current in any direction of the coil, and therefore if the outward shifting speed of the magnetic head is too fast, it is possible to brake the voice coil motor 340 by leading in the coil current and thereby to prevent the magnetic head from hitting against the ramp. Moreover this embodiment, as it detects the shifting speed of the head at the time of power interruption and controls the current to be made to flow to the voice coil motor on that basis, enables more accurate shunting.

Figure 6:
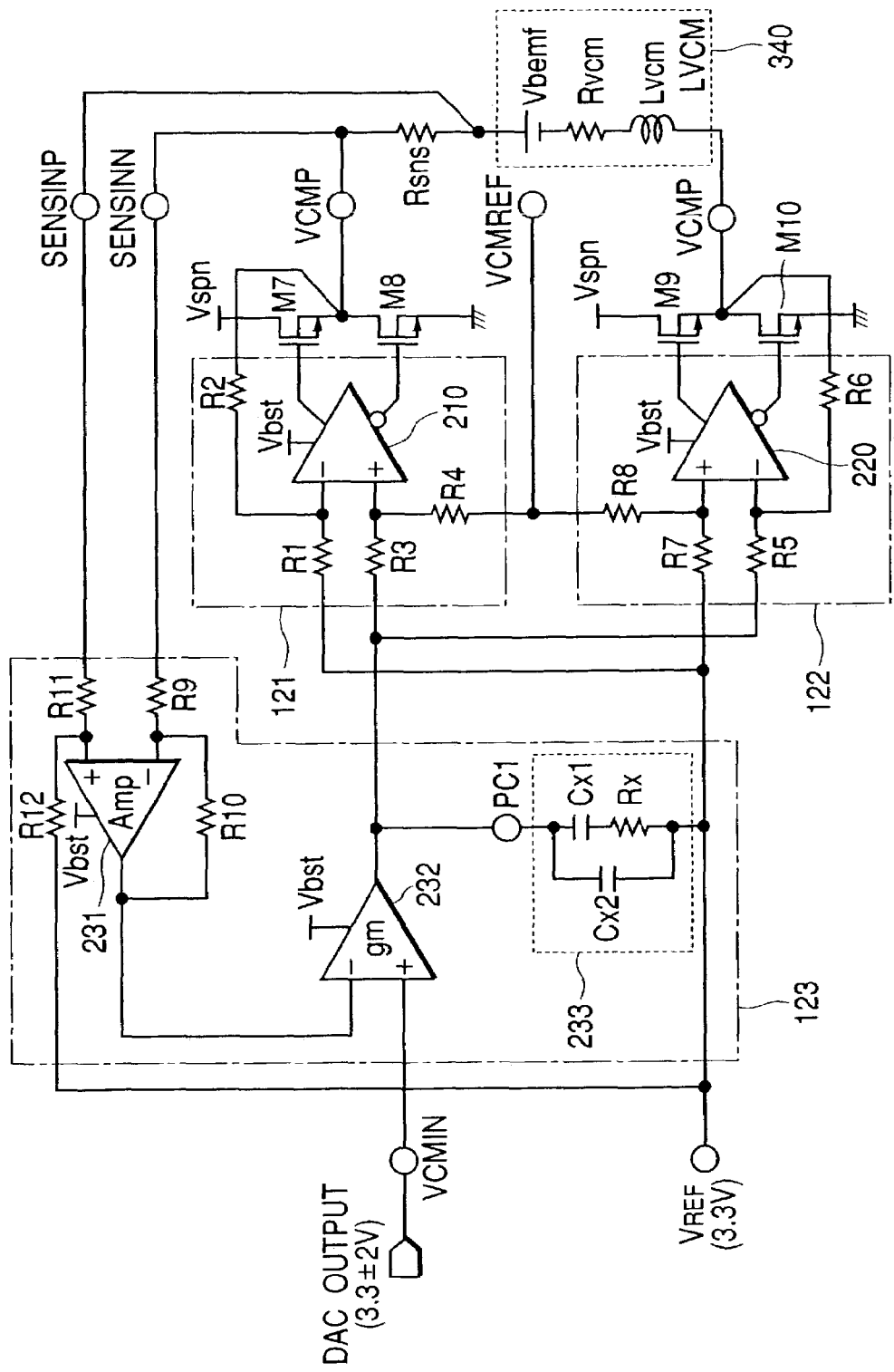
FIG. 6 is a block diagram showing an example of more detailed configuration of a coil drive circuit (VCM driver) constituting the drive control circuit for the voice coil motor.

FIG. 6 showing an example of the VCM driver 120 described above. In FIG. 6, the coil LVCM of the voice coil motor 340 is represented by an equivalent circuit consisting of an intrinsic inductance Lvcm, an interval resistor Rvcm and an electromotive force source Vbemf.

As shown in FIG. 6, the VCM driver circuit 120 is mainly configured of coil drive amplifiers 121 and 122 for driving power MOSFETs M7, M8, M9 and M10 which makes currents flow to the coils, a control amplifier 123 for comparing the detection value of the sense resistor Rsns and the output of the D/A converter 150 and generating input signals to the coil drive amplifiers 121 and 122, and a voltage change-over switch SW1. The coil drive amplifier 121 (122) consists of an output amplifier 210 (220), a feedback resistor R2 (R6) and input resistors R1, R3, and R4 (R5, R7 and R8).

The control amplifier 123 is configured of a current sense amplifier 231 into which the voltages of both terminals the current sense resistor Rsns are entered, a voltage input—current output type differential amplifier circuit (herein after referred to as the gm amplifier) 232 to which the output of the current sense amplifier 231 and the output of the D/A converter 150 are entered, and a phase compensating circuit 233 for performing phase compensation of the current control loop. The reference voltage VREF is applied to one each of the input terminals of the output amplifiers 210 and 220 and the current sense amplifier 231 via the resistors R1, R7 and R12, respectively, and supplies voltages matching the potential differences between the reference voltage VREF and the respective input voltages.

In the amplifiers 231 and 232, the gains and other characteristics of circuit operation are set to be desirable by optimally determining the resistances in each amplifier and the constants of transistors and other elements. The amplifiers 231 and 232 use the source voltage Vspn and the boosted voltage Vbst to meet their power requirements, and continue their operation even during a power failure.

The prescribed voltage gains of the coil drive amplifiers 121 and 122 are determined by the resistors R1 through R4 and R5 through R8, respectively. The coil drive amplifiers 121 and 122 use the boosted voltage Vbst to meet their power requirements, and continue their operation even during a power failure. Between the coil terminals VCMP and VCMN to which the power MOSFETs M7 through M10 driven by the coil drive amplifiers 121 and 122, there are connected in series the coil Lvcm of a voice coil motor 108 and the sense resistor Rsns, and a drive current is made to flow to the coil Lvcm by the power MOSFETs M7 through M10. This drive current is configured to permit the pair of coil drive amplifiers 121 and 122 to make currents flow in two directions, and the magnetic head is shifted in any desired one of the directions, towards the inside or the outside of the disk depending on the flowing direction of the drive current.

Figure 7:
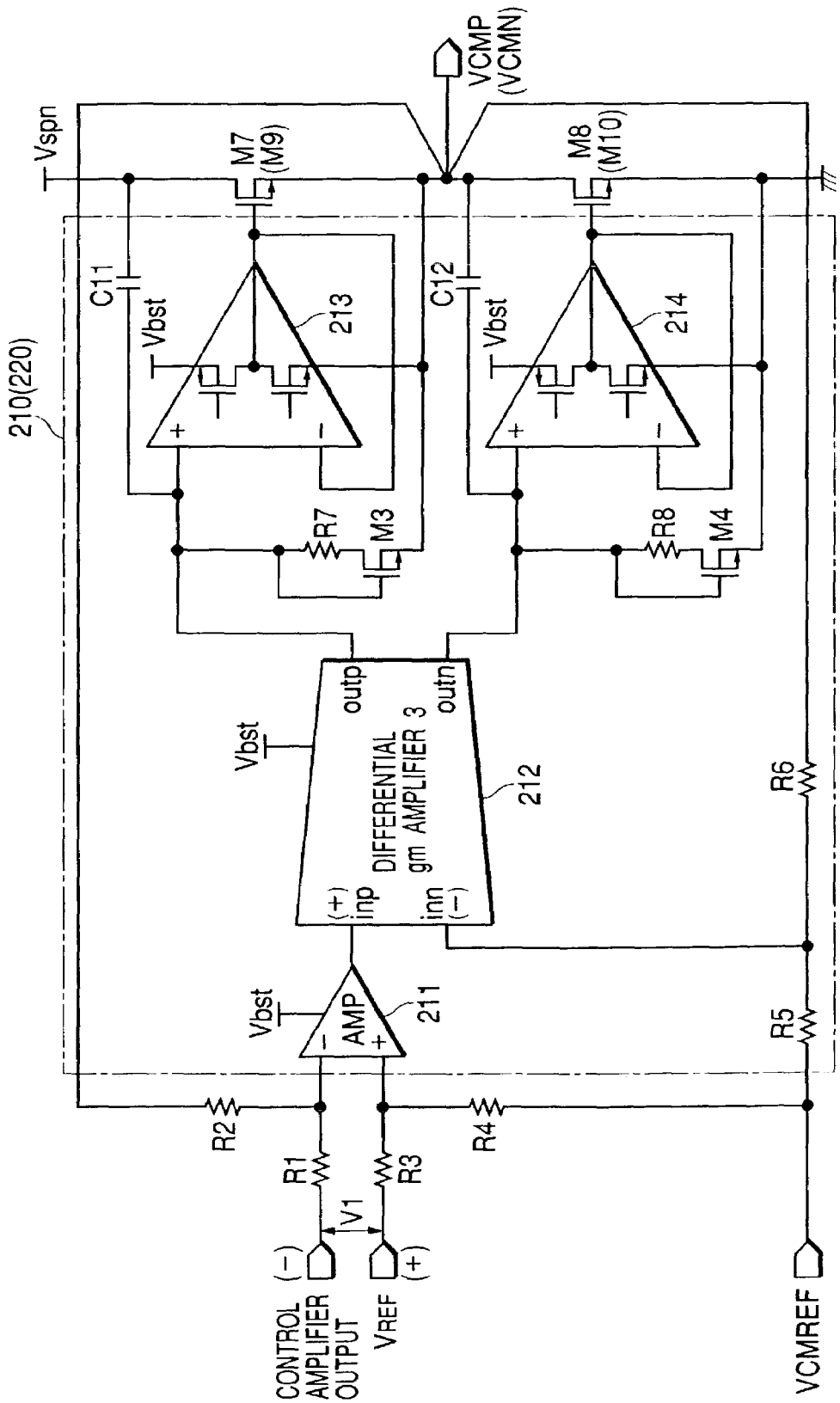
FIG. 7 is a block diagram showing a specific example of an output amplifier constituting the coil drive circuit (VCM driver).

FIG. 7 shows a specific example of circuit configuration of the output amplifier 210 (220) out of the circuits shown in FIG. 6.

As shown in FIG. 7, the output amplifier 210 (220) is mainly configured of a differential amplifier 211 into which a voltage supplied from the control amplifier 232 or a retract control voltage Vret and the reference voltage VREF are entered, a gm amplifier 212 into which the output of this differential amplifier 211, the voltage of the coil terminal VCMP (VCMN), and a voltage resulting from the division of the reference voltage VCMREF by the resistors R5 and R6 are entered, a pair of buffer amplifiers 213 and 214 receiving one of the differential outputs of the gm amplifier 212 at their respective uninverted input terminals and operating as voltage followers, capacitors C11 and C12 connected between the uninverted input terminals and the source voltage terminals of the buffer amplifiers 213 and 214 and performing phase compensation, and the resistor R7, the MOSFET M3, R8 and M4 connected in series between uninverted the input terminals and the coil terminals VCMP (VCMN) of the buffer amplifier 213 and 214.

The gm amplifier 212 is an amplifier whose characteristics are so set that its output varies substantially linearly with the variations in the output voltage of the differential amplifier 211 at the previous stage, and to the inverted input terminal (−) of this amplifier 212 is fed back via the resistor RE the voltage of the coil terminal VCMP (VCMN) to which the coil Lvcm of the voice coil motor is connected. The constant number of elements constituting the circuitry is so set that the whole circuit including the gtn amplifier 212, the buffer amplifiers 213 and 214 connected at the following stage and the output transistors M7 and M8 amplify the input voltage with a high gain and supply a drive voltage which varies according to variations in input.

Next will be described the part of circuitry shown in FIG. 7 including the buffer amplifiers 213 and 214 provided between the gm amplifier 212 and the output transistors M7 and M8.

As shown in FIG. 7, the positive phase output (+) of the gm amplifier 212 is inputted to the uninverted input terminal of the buffer amplifier 213, and the output voltage of this buffer amplifier 213 is applied to the gate terminal of the output transistors M7. The buffer amplifier 213 receives the feedback of its output voltage to its own inverted input terminal and operates as a voltage follower. The reason for the arrangement of such an amplifier is that the output transistor M1 has a large gate capacity because of its large size, and the drive force would become insufficient for direct driving with the output of the gm amplifier 212 while maintaining desired characteristics.

Regarding the resistor R7 and the MOS transistor M3 connected in series between the positive phase side output terminal and the coil terminal VCMP of the buffer amplifier 213, since the buffer amplifier 213 operates as a voltage follower, it is seen that the voltage applied to the gate of this MOS transistor M3 and that applied to the gate of the output transistor M7 are the same, and accordingly M7 and M3 constitutes a current mirror circuit. Therefore, supposing that the size ratio between the MOS transistors M7 and M3 is N, the output transistor M7 is so driven as to make flow a current N times as large as the drain current of M3.

Similarly, the negative phase output (−) of the gm amplifier 212 is entered into the uninverted input terminal of the buffer amplifier 214, and the output voltage of this buffer amplifier 214 is applied to the gate terminal of the output transistors M9. The buffer amplifier 214 receives the feedback of its output voltage to its own inverted input terminal and operates as a voltage follower. Regarding the resistor R8 and the MOS transistor M4 connected in series between the positive phase side output terminal and the coil terminal VCMP of the buffer amplifier 214, since the voltage applied to the gate of the MOS transistor M4 and that applied to the gate of the output transistor M8 are the same, M4 and M8 constitute a current mirror circuit. Therefore, supposing that the size ratio between the MOS transistors M2 and M6 is N, the output transistor M8 is so driven as to make flow a current N times as large as the drain current of M4.

The resistors R7 and R8 provided in series to the transistors M3 and M4 have little significance when a relatively small current is entered from the gm amplifier 212. When a relatively large current begins to be entered from the gm amplifier 212 and a large current is made to flow to the transistors M3 and M4, the gate-source voltage of the transistors M3 and M4 suddenly increases about the time the input current surpasses a certain level. Because of this, control is so performed that the gate-source voltage of the output transistors M7 and M8 vary more steeply than the variations in the input voltage of the gm amplifier 212.

To add, the circuit shown in FIG. 7 is so designed that the fall of the gate-source voltage of the output transistor M7 begins earlier than the rise of the gate-source voltage of the output transistor M8 by a method by which, for instance, the amplitude level of the gm amplifier 212 on the positive phase output and its amplitude level on the negative phase output are appropriately set. This enables the output transistors M7 and M8 to be turned on simultaneously to prevent a feedthrough current from flowing and thereby to restrain the increase in power consumption. Similarly, it may also be so designed that the rise of the gate-source voltage of the output transistor M8 begin earlier than the fall of the gate-source voltage of the output transistor M7.

Figure 8:
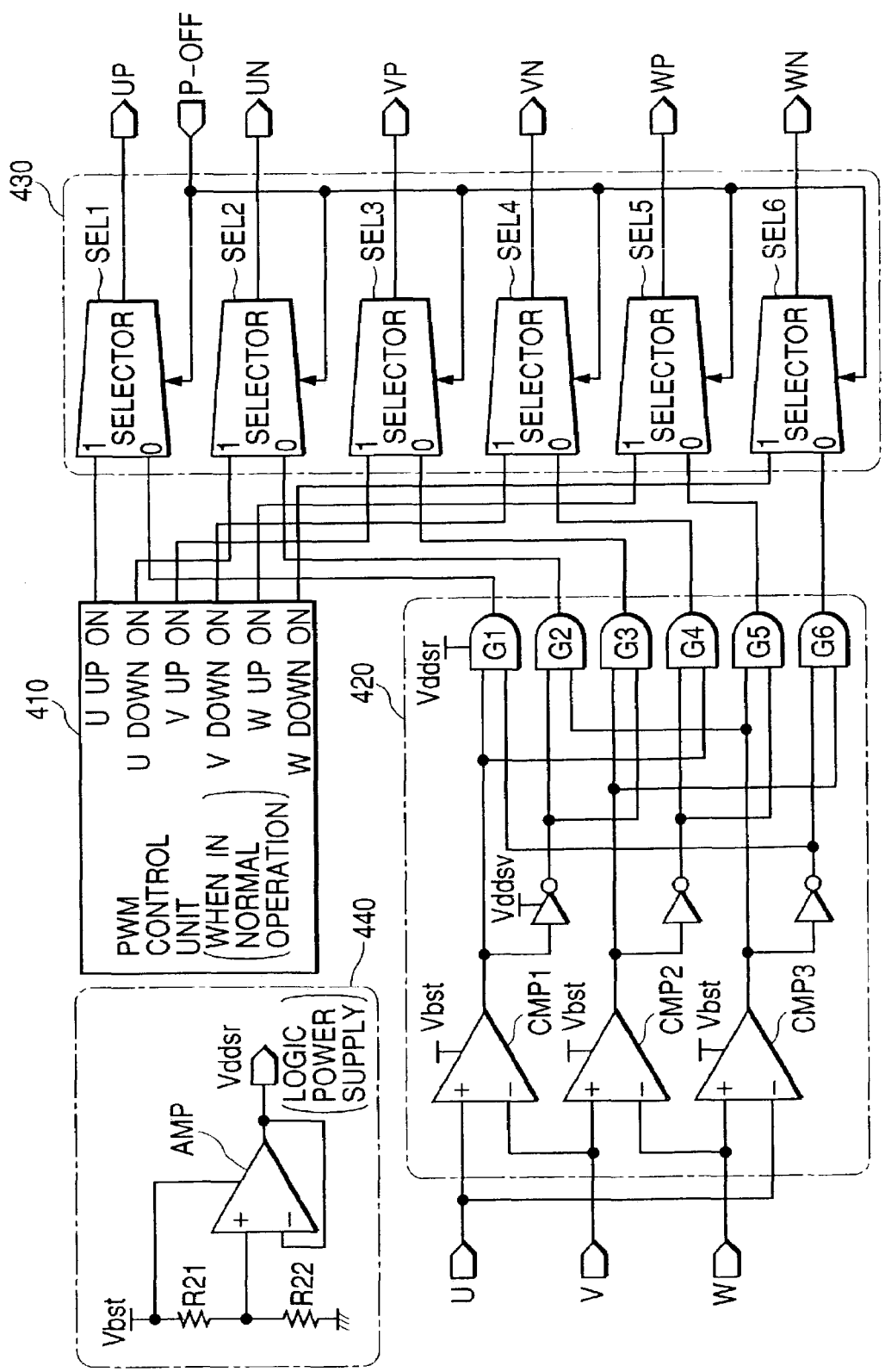
FIG. 8 is a block diagram showing an example of more detailed configuration of the drive control circuit for a spindle motor.

FIG. 8 shows an example of configuration of a circuit to perform synchronous rectification control over the spindle motor when the control circuit 111 within the spindle motor driver 110 shown in FIG. 2 requires, in a power failure in particular, retract control of the magnetic head.

In FIG. 8, reference numeral 410 denotes a PWM control unit for generating a control signal for PWM control during normal operation; 420, asynchronous rectification control unit for generating a control signal for synchronous rectification control when retract control is performed; 430, a selector unit for selecting either the control signal supplied from the PWM control unit 410 or the control signal supplied from the synchronous rectification control unit 420 and supplying it to the preamplifiers 112 through 114 shown in FIG. 2; and 440, a logic power supply unit for lowering the boosted voltage Vbst supplied from the booster circuit and thereby generating a source voltage Vddsr required for the operation of the logic circuit within the synchronous rectification control unit 420 in time of a power failure.

The logic power supply unit 440 consists of a resistance type voltage dividing circuit for dividing the boosted voltage Vbst with resistors R21 and R22 to generate desired potentials, and a buffer amplifier AMP for supplying a voltage of the same level as the divided voltages at a low impedance. The selector unit 430 consists of selectors SEL1 through SEL6, which are so configured as to be switched over with the output P-OFF from the power supply monitoring circuit 160 and, when power supply is interrupted, to select the output from the synchronous rectification control unit 420 instead of that from the PWM control unit 410 and supply it to coils U, V and W.

The synchronous rectification control unit 420 is configured of comparators CMP1, CMP2 and CMP3 for comparing two at a time of the terminal voltages U, V and W of the drive coils of the spindle motor, consisting of a three-phase brushless motor, in the U, V and W phases, and AND gates G1 through G6 whose inputs are combinations of the output signals of these comparators CMP1, CMP2 and CMP3 and their inverted signals. The synchronous rectification control unit 420, by detecting the magnitudes of the back electromotive forces of coils and determining the direction and timing of the current to be made to flow to each coil, performs synchronous rectification control to drive the coils in synchronism with the motor revolution. More specifically, there takes place control to turn on the output transistor on the source voltage Vcc side of the phase in which the back electromotive force is the strongest and the output transistor on the ground side of the phase in which the back electromotive force is the weakest to make currents flow to the coils.

Figure 9:
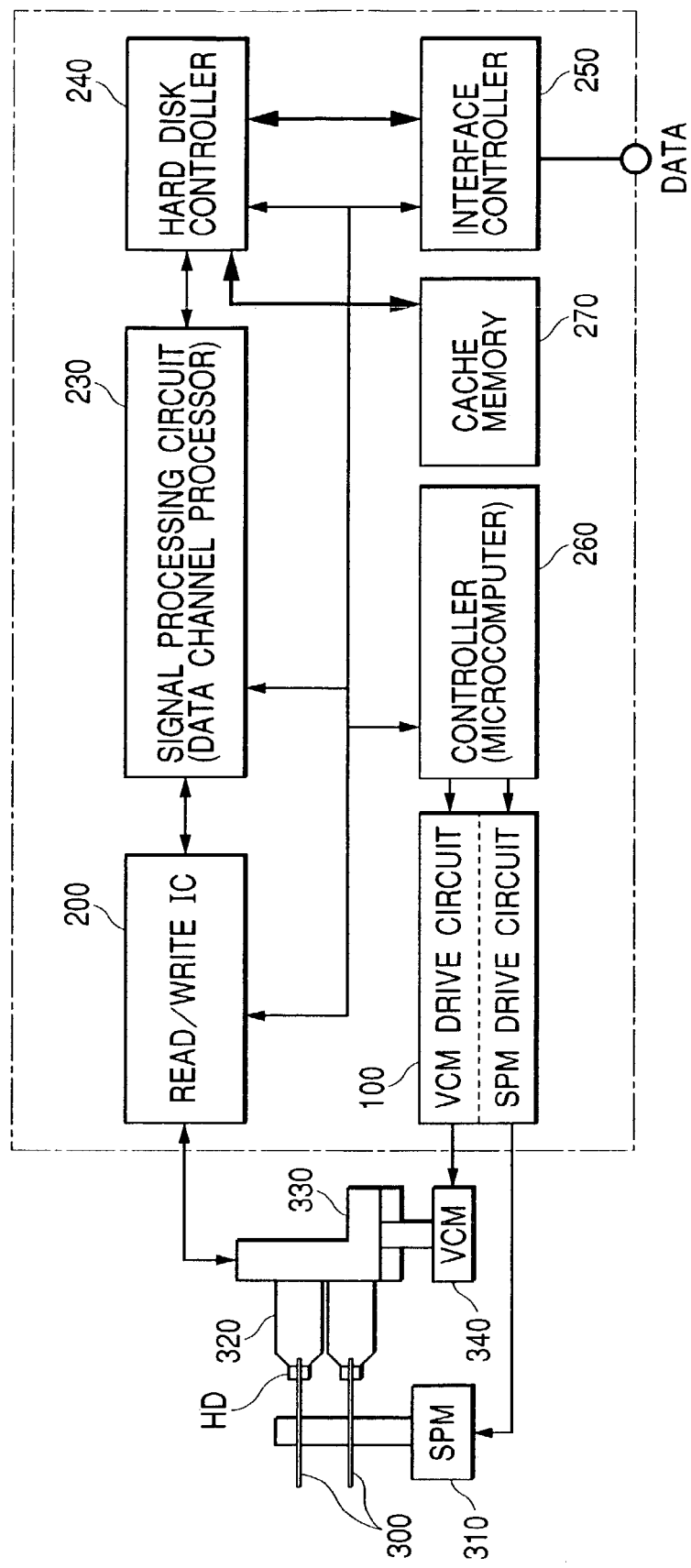
FIG. 9 is a block diagram schematically showing an overall configuration of the magnetic disk memory device to which the invention is applied.

FIG. 9 is a block diagram of a typical configuration of a whole hard disk device as an example of magnetic disk system including a voice coil motor control system, a spindle motor control system and a magnetic head drive control system having the configuration shown in FIG. 2.

In FIG. 9, reference numeral 310 denotes a spindle motor for rotating the magnetic disk 300: 320, an arm having magnetic heads (including a write magnetic head and a read magnetic head) HD at its tip; and 330, a carriage for rotatably holding this arm 320. The voice coil motor 340 shifts the magnetic heads by moving the carriage 330, and the motor drive circuit 100 performs servo control so as to have the center of the magnetic head coincide with the center of the track.

The motor drive circuit 100 is a semiconductor integrated circuit in which the voice coil motor drive control circuit and the spindle motor drive control circuit shown in FIG. 2 are integrated, operates in accordance with control signals supplied from the controller 260, and performs servo control over the voice coil motor 340 and the spindle motor 310 so as to shift the magnetic head to a desired track in a seek or to keep constant the relative speed of the magnetic head.

Reference numeral 200 denotes a read/write IC for amplifying a current responsive to variations in magnetism detected by the magnetic head HD and transmitting a read signal to a signal processing circuit (data channel processor) 230s or amplifying a signal processing circuit 230 write pulse signal and supplying a drive current for the magnetic head HD; and 240, a hard disk controller for accepting read data transmitted from the signal processing circuit 230 and subjecting them to error correction processing or subjecting write data from the host to error correction encoding and supplying the processed data to the signal processing circuit 230. The signal processing circuit 230 performs modulation/demodulation suitable for digital magnetic recording or signal processing taking account of the characteristics of magnetic recording, such as wave shaping, and reading positional information out of read signals of the magnetic head HD.

Reference numeral 250 denotes an interface controller for exchanging and controlling data between this system and an external device, and the hard disk controller 240 is connected via the interface controller 250 to a host computer, such as the microcomputer of a personal computer; and 270, a buffer cache memory for temporarily storing read data read out of the magnetic disk at high speed. A system controller 260, consisting of a microcomputer, identifies the type of the operating mode on the basis of a signal from the hard disk controller 240, controls different parts of the system according to the identified operating mode, and computers a sector position and the like on the basis of address information supplied from the hard disk controller 240.

The invention made by the present inventor has been described so far in specific terms with reference to a preferred embodiment thereof, but the invention is not limited to the embodiment, but it goes without saying that the invention can be modified in various ways without deviating from its essentials. For instance, although the power required after the interruption of power supply is derived by performing synchronous rectification control over the output transistors M1 through M6 for driving the spindle motor in the foregoing embodiment, it can as well be obtained by rectifying the back electromotive force with the body diodes of the output transistors M1 through M6 instead of synchronous rectification control, or else a diode bridge for rectification use can be provided separately.

In the embodiment, there is provided a ramp as a standby position outside the disk and the magnetic head to this ramp when power supply is interrupted, but the invention can as well be applied to a case in which standby position is provided inside the disk and the magnetic head is shunted inside the disk when power supply is interrupted.

Although the foregoing description concerned the invention by the present inventor with respect to a hard disk memory device, which belongs to the field of utilization underlying the invention, the invention is not limited to it, but can be applied to disk memory devices in general.

The advantages obtained by typical aspects of the invention disclosed in the present application will be briefly described below.

Thus, in a magnetic disk memory device, the shifting speed of the magnetic head in time of power supply interruption is detected and a voice coil motor is controlled on the basis of the detected shifting speed and the speed target, the magnetic head can be shunted and promptly and, at the same time, it is possible, when power supply is interrupted during a shift of the magnetic head toward a ramp outside the disk, braking can be applied by limiting the back electromotive force generated by the voice coil motor thereby to prevent the magnetic head from hitting against the ramp.

Further according to the invention, in time of interruption of power supply to a magnetic disk memory device whose spindle motor is a small one with only a weak back electromotive force or when the revolution of its spindle motor is slow, its magnetic head can be securely shunted by driving its voice coil motor with a voltage resulting from the synchronous rectification of the back electromotive force of the voice coil motor. As a result, the retract driver can be dispensed with, the chip size of the drive control IC for the voice coil motor can be reduced, resulting in the benefit of realizing a compact and reliable magnetic disk memory device.

What is claimed is:

1. A magnetic disk system comprising: a first motor for revolving a magnetic disk; a magnetic head for reading information out of a memory track on the magnetic disk; a second motor for shifting the magnetic head over said disk; a second motor drive circuit including a transistor for controlling a current to be made to flow to the coil of the second motor, for shifting the magnetic head by controlling the gate voltage of said transistor in accordance with a current command value; a control circuit capable of generating a current command value for the second motor drive circuit in time of power supply interruption; and a booster circuit capable of boosting a voltage resulting from the rectification of a back electromotive force generated in the coil of said first motor, wherein said control circuit, in time of power supply interruption and in a state in which said transistor is turned off, detects the shifting speed of the head on the basis of a back electromotive force generated in the coil of said second motor, generates the current command value which is to serve as a speed target, and supplies the current command value to said second motor drive circuit, and wherein said second motor drive circuit operates on a voltage boosted by said booster circuit, and in time of power supply interruption controls the current flowing to the coil of said second motor in accordance with the current command value from said control circuit to shift said magnetic head to a prescribed standby position.

2. The magnetic disk system according to claim 1, said control circuit comprising a register, and subtracting and multiplying circuits, wherein the back electromotive force matching the shifting speed of the head and generated in said coil of said second motor in time of power supply interruption and in a state in which said transistor is turned off is detected and held in said register, a reference current small enough not to affect the shifting speed of the magnetic head is made to flow to detect voltages at both ends of said coil, a potential difference due to parasitic resistance of said coil is computed by said subtracting circuit from the voltages at both ends of said coil and the value held in said register, the computed potential difference in held in said register, thereafter the voltages at both ends of said coil are detected to correct a product of multiplication of the potential difference held in said register and a current reading of the potential difference according to a current parasitic resistance, and the current command value to be supplied to said second motor drive circuit is generated based on the corrected value and a value to give the speed target.

3. The magnetic disk system according to claim 1, wherein said current command value is a digital value, and wherein the system further comprises: a D/A converter circuit for converting the current command value into an analog value; and change-over means for supplying said D/A converter circuit with the current command value generated by said control circuit in time of power supply interruption and with an external current command value during normal operation.

4. The magnetic disk system according to claim 1, further comprising a first motor drive control circuit which includes transistors for making currents flow to the coil of said first motor and performing revolution control over said magnetic disk by controlling the drive current for the coil of said first motor, wherein the first motor drive control circuit drives said transistors using pulse width modulation during normal operation and in time of power supply interruption rectifies the back electromotive force of said first motor by sequentially driving said transistors in synchronism with the revolution of said first motor.

5. The magnetic disk system according to claim 4, said control circuit comprising a timer circuit, wherein a signal to instruct the stop of said first motor is delivered to said first motor drive control circuit after the lapse of a prescribed length from the interruption of power supply, and said first motor drive control circuit brakes the revolution of said first motor in accordance with the instruction signal.

6. The magnetic disk system according to claim 3, wherein said control circuit comprises:

a control loop including: voltage detecting means for detecting the inter-terminal voltage of the coil of said second motor; an A/D converter circuit for converting the voltage detected by the voltage detecting means into a digital value; an integrating circuit for integrating the speed target values; a multiplying circuit for obtaining the product of multiplication of the output of the integrating circuit by the value held in said register; a first subtracting circuit for computing the difference between the output of the multiplying circuit and the output of said A/D converter circuit; and a second subtracting circuit for computing the difference between the output of the first subtracting circuit and the output of said speed target command value, and wherein the back electromotive force matching the shifting speed of the head and generated in said coil of said second motor in time of power supply interruption and in a state in which said transistor is turned off is detected and held in said register, a reference current small enough not to affect the shifting speed of the magnetic head is made to flow to detect voltages at both ends of said coil, a potential difference due to parasitic resistance of said coil is computed by said first subtracting circuit from the voltages at both ends of said coil and the value held in said register, the computed potential difference in held in said register, the voltages at both ends of the coil are detected while said control loop is operating and the balance of subtraction of the product of multiplication of the potential difference from the reference current due to the parasitic resistance held in said register from the voltages at the both ends as the current reading is computed by said first subtracting circuit as the potential difference according to the current parasitic resistance, the difference between the computed value and said speed target value is computed by said second subtracting circuit, and the value resulting from integration of the results by said integrating circuit is supplied to said D/A converter circuit to control the current flowing to the coil of said second motor.

7. The magnetic disk system according to claim 6, wherein said integrating circuit is provided with a limiter function to limit the maximum output.

8. The magnetic disk system according to claim 6, further comprising a first motor drive control circuit which includes transistors for making currents flow to the coil of said first motor and performing revolution control over said magnetic disk by controlling the drive current for the coil of said first motor, wherein the first motor drive control circuit drives said transistors using pulse width modulation during normal operation and in time of power supply interruption rectifies the back electromotive force of said first motor by sequentially driving said transistors in synchronism with the revolution of said first motor.

9. The magnetic disk system according to claim 8,
wherein said control circuit is provided with a timer circuit, and wherein a signal to instruct the stop of said first motor is delivered to said first motor drive control circuit after the lapse of a prescribed length from the functioning of said limiter, and said first motor drive control circuit brakes the revolution of said first motor in accordance with the instruction signal.

10. A magnetic disk system comprising: a first motor for revolving a magnetic disk; a magnetic head for reading information out of a memory track on the magnetic disk; a second motor for shifting the magnetic head over said disk; a second motor drive circuit, including a transistor for controlling a current to be made to flow to a coil of the second motor, for shifting the magnetic head by controlling a gate voltage of said transistor in accordance with a current command value; a control circuit for generating the current command value for the second motor drive circuit in time of power supply interruption; a booster circuit for boosting a voltage resulting from the rectification of a back electromotive force generated in the coil of said first motor; and a system control device for providing said second motor drive circuit with a target value of a current to be made to flow to the coil of said second motor, wherein a voltage resulting from the rectification of the back electromotive force generated in the coil of said first motor in time of power supply interruption is boosted by said booster circuit, said second motor drive circuit and said control circuit are operated with the voltage boosted by the booster circuit, and said control circuit, in time of power supply interruption and in a state in which said transistor is turned off, detects a back electromotive force generated in the coil of said second motor matching a shifting speed of the magnetic head, generates a command value for the current to be made to flow to the coil of said second motor according to the result of detection so as to equalize the shifting speed of the magnetic head to the command value, and supplies the command value to said second motor drive circuit, and shifts said magnetic head to its prescribed standby position by controlling the current to be made to flow to the coil of said second motor without the intervention of said system control device.

11. A magnetic disk drive system comprising:
a first motor, including a first coil, for revolving a magnetic disk;
a first motor drive control circuit for controlling and driving the first motor;
a magnetic head for reading information out of a track on the magnetic disk revolved by the first motor;
a second motor, including a second coil, for shifting the magnetic head over the magnetic disk;
a second motor drive circuit including a transistor for controlling a current to be made to flow to the second coil, for driving the second motor by controlling a gate voltage of the transistor in accordance with a first current command value;
a control circuit capable of generating a second current command value for the second motor drive circuit in time of power supply interruption; and
a booster circuit capable of boosting a voltage resulting from a rectification of a first back electromotive force generated in the first coil,
wherein in time of power supply interruption the control circuit detects a shifting speed of the magnetic head on a basis of a second back electromotive force generated in the second coil in a state in which the field effect transistor is turned off, the second motor drive circuit flows a first current to the second coil in a first period, the control circuit generates a first value by correcting a second value corresponding to the detected shifting speed use for a third value corresponding to a coil voltage, the control circuit generates the second current command value which is to serve as a speed target for a retract control, and the control circuit and the second motor drive circuit operates the retract control based on the second current command value and the first value by monitoring a first voltage between both terminals of the second coil and operating a feed back control that returns a monitoring result of the first voltage to the control circuit,
wherein the first current is small enough not to affect the shifting speed of the magnetic head,
wherein the coil voltage is between both terminals of the second coil and is determined based on the first current and the shifting speed, wherein the retract control shifts the magnetic head to a prescribed standby position, and wherein the second motor drive circuit and the control circuit operate on the voltage boosted by the booster circuit in time of power supply interruption.

12. The magnetic disk drive system according to claim 11, wherein the control circuit comprises a register, a first subtracting circuit, a second subtracting circuit and a multiplying circuit, wherein in time of power supply interruption, the second back electromotive force matching the shifting speed of the magnetic head and generated in the second coil in a state in which the transistor is turned off is detected and held in the register as the second value, the first current is made to flow to detect the coil voltage at both terminals of the second coil, the first value due to a parasitic resistance of the second coil is computed by the first subtracting circuit subtracting the second value in the register from the third value to hold the first value in the register, wherein in time of power supply interruption, the second current command value is generated by the control circuit, the multiplying circuit multiplies the first value by a predetermined value, a fourth value is computed by the first subtracting circuit subtracting the first value from a fifth value corresponding to a moving speed of the magnetic head, the second subtracting circuit subtracts the fourth value from the second current command value to generate a control error value, thereby to operate the retract control, wherein the fifth value corresponds to the first voltage, wherein the coil voltage is between both terminals of the second coil and is determined based on the shifting speed and a voltage drop in connection with the parasitic resistance caused by the first current flowing to the second coil.

13. The magnetic disk drive system according to claim 11, wherein each of the first and second current command value is a digital value, and wherein the magnetic disk drive system comprises:

a D/A converter for converting each of the first current command value and a control error value into an analog value; and a switching circuit for supplying the D/A converter with the control error value in time of power supply interruption instead of the first current command value supplied from outside during normal operation, wherein the control error value based on the second current command value is generated by the control circuit, wherein the control error value controls the magnetic head to shift the magnetic head to the prescribed standby position in time of power supply interruption.

14. The magnetic disk drive system according to claim 11, wherein the first motor drive control circuit includes transistors for making a drive current flowing to the first coil and performing revolution control of the magnetic disk by controlling the drive current for the first coil, wherein the first motor drive control circuit drives the transistors using pulse width modulation during normal operation and rectifies the first back electromotive force of the first motor by sequentially driving the transistors in synchronism with a revolution of the first motor in time of power supply interruption.

15. The magnetic disk drive system according to claim 14, the control circuit comprising a timer circuit, wherein an instruct signal to instruct a stop of the first motor is delivered to the control circuit after a lapse of a prescribed length from the power supply interruption, and the first motor drive control circuit brakes the revolution of the first motor in accordance with the instruction signal, wherein a time-up signal is outputted from the timer to the control circuit after the lapse of the prescribed length so as to transmit the instruct signal to the control circuit.

16. The magnetic disk drive system according to claim 13, wherein the control circuit comprises:

a control loop for the retract control, wherein the control loop includes:

a voltage detecting circuit for detecting an inter-terminal voltage of the second coil;

an A/D converter for converting the inter-terminal voltage detected by the voltage detecting circuit into a digital value;

a register in which the digital value corresponding to the inter-terminal voltage is held;

an integrating circuit for integrating the control error value;

a multiplying circuit for obtaining a product of multiplication of an output of the integrating circuit;

a first subtracting circuit for computing a difference between an output of the multiplying circuit and an output of the A/D converter; and a second subtracting circuit for computing a difference between an output of the first subtracting circuit and the control error value.

17. The magnetic disk drive system according to claim 16, wherein the integrating circuit is provided with a limiter function to limit a maximum output of the field effect transistor.

18. The magnetic disk drive system according to claim 17, wherein the first motor drive control circuit includes transistors for making a drive current flowing to the first coil and performing revolution control of the magnetic disk by controlling the drive current for the first coil, wherein the first motor drive control circuit drives the transistors using pulse width modulation during normal operation and rectifies the first back electromotive force of the first motor by sequentially driving the transistors in synchronism with a revolution of the first motor in time of power supply interruption.

19. The magnetic disk drive system according to claim 18, wherein the control circuit includes a timer circuit and wherein an instruct signal to instruct a stop of the first motor is delivered to the control circuit after a lapse of a prescribed length from a functioning of the limiter, and the first motor drive control circuit brakes a revolution of the first motor in accordance with the instruction signal, wherein a time-up signal is outputted from the timer to the control circuit after the lapse of the prescribed length so as to transmit the instruct signal to the control circuit.

20. A hard disk drive system comprising:

a first motor, including a first coil, for revolving a magnetic disk;

a first motor drive control circuit for controlling and driving the first motor;

the magnetic disk;

a magnetic head for reading information out of a track on the magnetic disk revolved by the first motor;

a second motor, including a second coil, for shifting the magnetic head over the disk;

a second motor drive circuit, including a field effect transistor for controlling a current to be made to flow to the second coil, for driving the second motor by controlling a gate voltage of the field effect transistor in accordance with a first current command value;

a control circuit for generating a second current command value for the second motor drive circuit in time of power supply interruption;

a booster circuit for boosting a voltage resulting from a rectification of a first back electromotive force generated in the first coil;

a system control unit for providing the second motor drive circuit with the first current command value to be made to flow the current to the second coil;

a read/write unit for transmitting the information from the magnetic disk to a signal processing unit and transmitting a write data from the signal processing unit to the magnetic head; and the signal processing unit for executing a modulation operation for the write data and a demodulation operation for the information, wherein in time of power supply interruption, without an input of a control signal from the system control device to the second motor drive circuit and the control circuit, the voltage resulting from the rectification of the first back electromotive force generated in the first coil is boosted by the booster circuit, the second motor drive circuit and the control circuit are operated with the voltage boosted by the booster circuit, the control circuit detects a second back electromotive force generated in the second coil and matching a shifting speed of the magnetic head in a state in which the field effect transistor is turned off, the second motor drive circuit flows a first current to the second coil in a first period, generates a first value by correcting a second value corresponding to detecting the shifting speed from a third value corresponding to a coil voltage, the control circuit generates the second current command value for a drive current to be made to flow to the second coil so as to equalize a moving speed of the magnetic head to the second current command value, and the control circuit and the second motor drive circuit operates a retract control based on the second current command value and generates the first value by monitoring a first voltage between both terminals of the second coil and operates a feed back control to return a monitoring result of the first voltage to the control circuit, wherein the first current is small enough not to affect the shifting speed of the magnetic head, wherein the retract control shifts the magnetic head to a prescribed standby position, wherein the coil voltage is between both terminals of the second coil and is determined based on the shifting speed and a voltage drop in connection with the parasitic resistance of the second coil caused by the first current flowing to the second coil.

\* \* \* \* \*